United States Patent [19]

Bergey

[11] Patent Number: 5,076,730
[45] Date of Patent: Dec. 31, 1991

[54] EARTH DUCT TUNNEL ENLARGEMENT APPARATUS AND METHOD

[76] Inventor: Michael J. Bergey, 4616 Porter Center Rd., Lewiston, N.Y. 14092

[21] Appl. No.: 689,955

[22] Filed: Apr. 23, 1991

[51] Int. Cl.$^5$ .............................................. F17L 55/18
[52] U.S. Cl. ..................................... 405/154; 72/119; 72/126; 138/97; 166/55.1; 166/298; 405/303
[58] Field of Search .................. 405/154, 156; 72/122, 72/126, 119; 166/55, 55.1, 297, 298, 206, 207, 277; 138/97

[56] References Cited

U.S. PATENT DOCUMENTS

| | | | |
|---|---|---|---|
| 1,312,333 | 8/1919 | Lebow | 72/119 |
| 1,970,061 | 8/1934 | Stanfield et al. | 72/126 |
| 2,546,756 | 3/1951 | Knowlton | 72/126 |
| 2,627,891 | 2/1953 | Clark | 72/119 |
| 4,134,286 | 1/1979 | Martin | 72/122 |
| 4,232,442 | 11/1980 | Brunaud | 72/122 X |
| 4,309,128 | 1/1982 | Williams | 405/156 X |
| 4,457,647 | 7/1984 | Dusette et al. | 405/156 X |
| 4,726,711 | 2/1988 | Tian | 405/184 |
| 4,789,268 | 12/1988 | Yarnell | 405/154 |
| 4,848,964 | 7/1989 | Yarnell | 405/154 |
| 4,869,619 | 9/1989 | Akesaka | 405/184 |
| 4,930,542 | 6/1990 | Winkle et al. | 405/154 |

Primary Examiner—Dennis L. Taylor
Attorney, Agent, or Firm—Wallace F. Neyerlin

[57] ABSTRACT

A method of and an apparatus for relieving ground pressure surrounding pvc vent pipes which have been displaced from their T-fitting traps in sewer systems. The round tubular nature of a semi-rigid pipe is changed to an elliptical or oval shape with initial insertion and rotation of a special tool. The tool being connected to a drive-shaft and rotated by an external source such as a drill motor. The rotation of the tool within the pipe progressively causes the pvc pipe to have a momentary elliptical cross-sectional shape as the tool rotates within the previously round pipe, without rotating the pipe. As the tool passes down (or "screws down") through the pipe, the pipe re-assumes its circular cross-sectional shape, and original diameter, but only after its larger-dimension elliptical cross-section has pressurized the earth duct and increased its diameter to about an inch greater than its initial (unpressured) circular diameter.

6 Claims, 5 Drawing Sheets

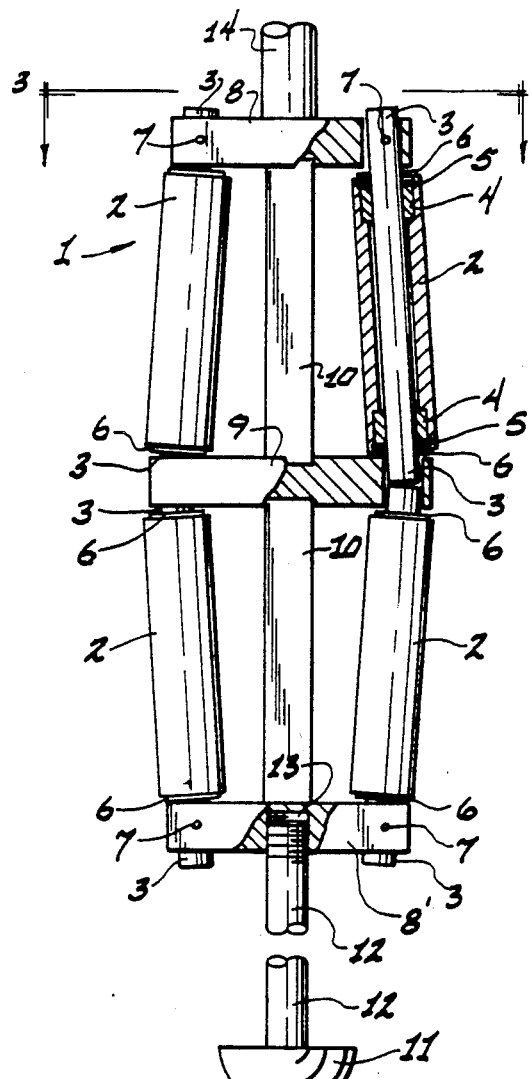
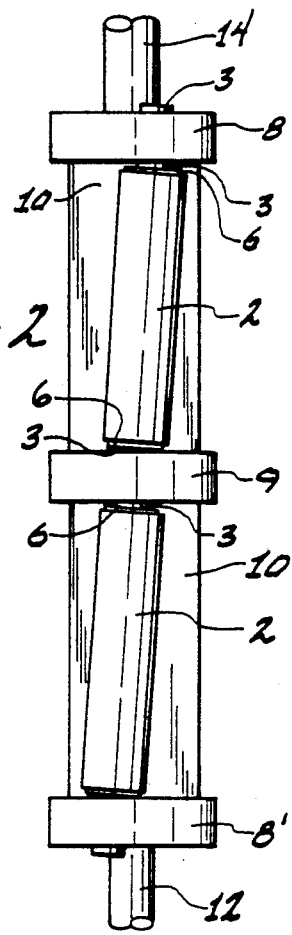
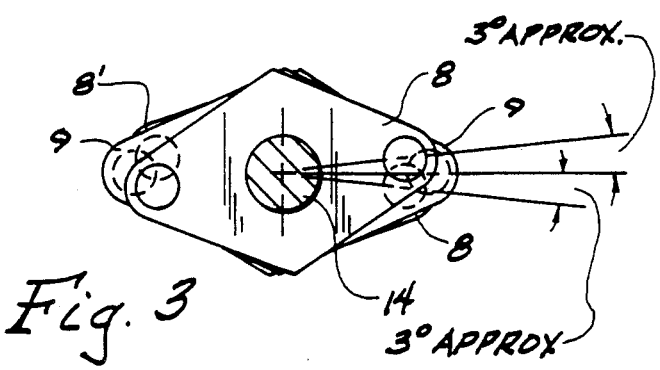
Fig. 1
Fig. 2
Fig. 3

EARTH DUCT TUNNEL ENLARGEMENT APPARATUS AND METHOD

BACKGROUND OF THE INVENTION

Field of the Invention

This invention relates in general to the enlargement of earth duct around a semi-rigid pipe in which the pipe has previously been buried and surrounded by the earth. The invention is particularly described with respect to what is known as 4 inch schedule 35 polyvinyl chloride (pvc) pipe but is not restricted thereto.

The problem addressed and which this invention solves is how to remove or reduce the surrounding inward pressure of the earth material exerted towards the outside surface of a given buried pipe, (such as a 4" schedule 35 vertical sanitary vent which has been lifted out of its T fitting trap by frost), so as to thereby enable enlarging the diameter of the earth duct tunnel surrounding same. Such pvc vertical sanitary vent pipes have been installed in thousands of home lots in northern parts of the United States; and within a time span, of such as short as one year or a few years after installation, upward pressure exerted upon such pipes by the repeated freezing and thawing of the ground near its surface causes the pipes to heave and become separated from the T-fitting traps to which they are originally connected, thereby leading to environmental and pollution problems, as are referred to in more detail hereinafter.

In the past, choices made to solve said problems have been to excavate from the surface to remove the surrounding ground pressure to allow removal or adjustment of this pipe; or to try to force the pipe downward to return it into the T-lifts trap below, but typically misalignment of the pipe in relation to the T-fitting trap generally inhibits re-insertion because of slight sideward displacement (as well as vertical displacement) of the pipe. Also, deeper sewer lines create more friction from the earth to inhibit press reinsertion without pipe damage.

The shortcomings of such alternatives are the harm done to the appearance of the ground surface and also the time delay between total ground settlement and finish grading to restore the ground surface to its "pre-excavation" state, and appearance, as well as high relative expenses as compared to the method of this invention. And reinsertion only temporarily solves the problem, for the frost action continues.

SUMMARY OF THE INVENTION

A principal object of this invention, in contrast to the above digging methods, is to accomplish a method of relieving ground pressure surrounding the pvc pipe without disturbing the surface as in the conventional digging method of re-connecting the pipe to its T-fitting trap. The present invention achieves this goal by changing the natural round tubular nature of the semi-rigid pipe to an elliptical or oval shape with initial insertion and rotation of the tool apparatus of this invention, the tool being connected to a driveshaft of desired length and rotated by an external source such as a drill motor, or manually, such as with a common pipe wrench. The rotation of the tool within the pipe progressively causes the pvc pipe to have a momentary elliptical cross-sectional shape as the tool rotates within the previously round pipe, without actually rotating the pipe itself. As the tool passes down (or "screws down") through the pipe, the pipe re-assumes its circular cross-sectional shape, and original diameter, but only after its larger-dimension elliptical cross-section has pressurized the earth duct and increased its diameter to about an inch greater than its initial (unpressured) circular diameter.

Rollers exert pressure against the interior wall of the pvc pipe and bearings are incorporated in the rollers of the tool/apparatus of the invention to reduce friction between the rollers and the interior wall of the pipe and to prevent interior damage to the pvc pipe during the duct enlargement process. While the circumference of the pvc pipe in its prior round shape and its forced elliptical shape remain equal, the maximum cross-section dimension of the elliptical shape of the pipe, caused momentarily by the tool as it is screwed into the pipe, is greater than the diameter of its circular shape, thus progressively enlarging the earth duct which surrounds the buried pipe as the tool is being operated and rotated by the drill motor. Other incorporated important features in the tool are angled roller placement to conform to the angle of the pipe when in its transitional state to insure even distribution of roller pressure as well as a vertical twist to create a screw like effect that causes the tool to advance and retreat within the pipe in relation to rotational direction.

BRIEF DESCRIPTION OF THE DRAWINGS

FIG. 1 is a front vertical view of the device or tool apparatus of the invention, shown partly in section;

FIG. 2 is a side vertical view of the device or tool apparatus;

FIG. 3 is a top view of the device, taken along the line 3–3 of FIG. 1;

Figures 4, 5:
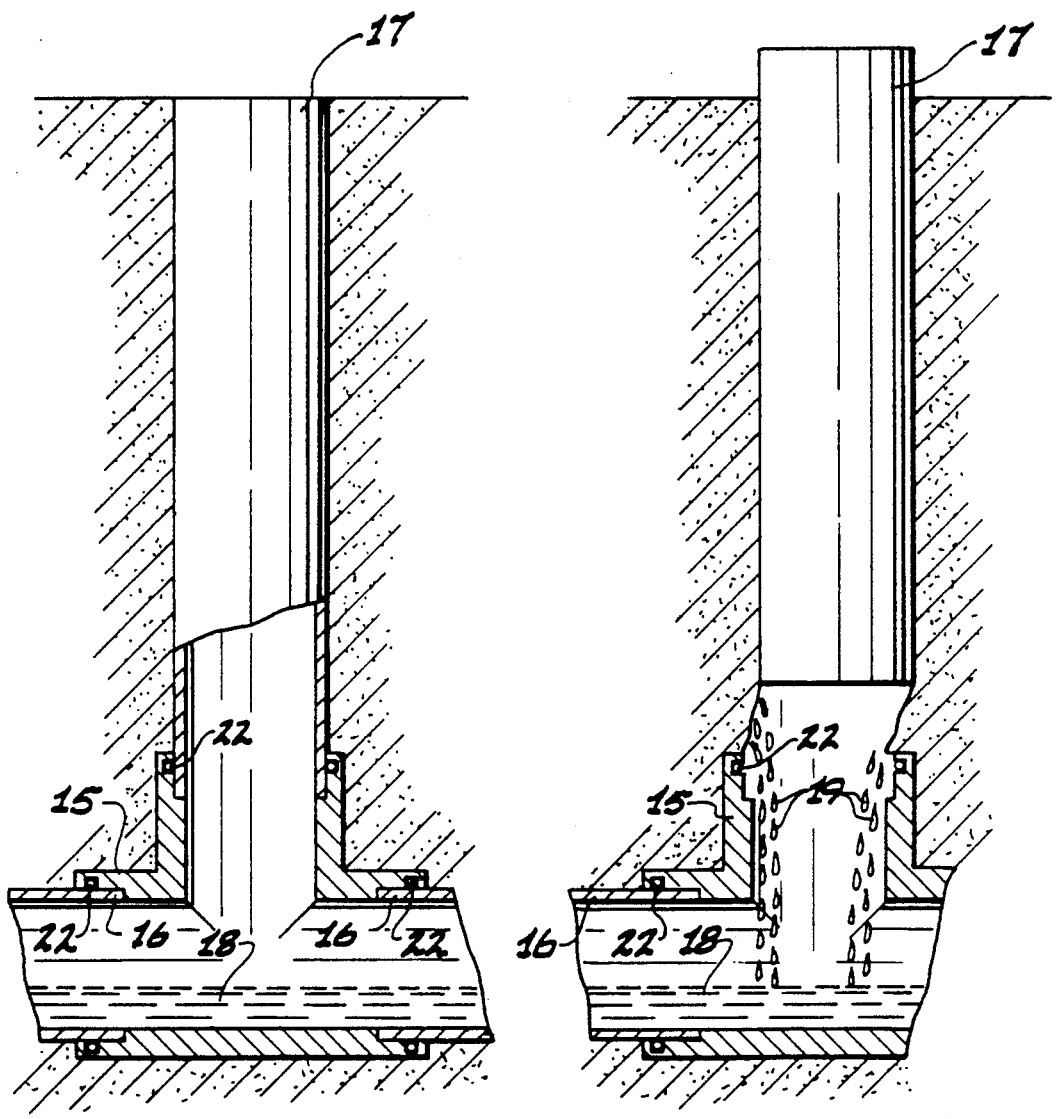
FIG. 4 is a vertical section view showing a pvc pipe vent in its proper fitting in its T-shaped trap.
FIG. 5 is a vertical section view showing a pvc pipe vent displaced both vertically and laterally from its former T-shaped trap, showing also seepage of ground water into the trap.

Detailed Description of the Drawings and of the Preferred Embodiments

Referring now to the drawings in more detail, in FIG. 1 the device of the invention is designated generally by the numeral 1. The device utilizes four rollers 2 in its construction which are mounted between three substantially parallel frame mounting elements or flanges, a center flange 9, a top flange 8 and a bottom flange 8'. Support blocks 10 are also mounted (such as by welding) between the center flange 9 and each end flange 8 and 8' for structural support, rigidity and strength. Each of the rollers is mounted around or surrounds an axle 3, which axles, in turn, are fixed angularly in the flanges, as shown, by retaining pins 7. The axes of the opposite sets of said pipe rollers are, obviously, not exactly vertically aligned with each other, but rather are intentionally off-set from each other by an angle of approximately 6 degrees, so as to create a twisted frame which creates a screw effect as the tool is driven by an external power source and rotated within the semi-rigid pipe which has been displaced from its position in its T-fitting trap. Axles 3 are each preferably surrounded near each of their ends by bearings 4, retaining rings 5 and washers 6 (as illustrated by the partial cross-sectional view of FIG. 1). The bearings 4 provide for easy rotation of the rollers 2 about their axles 3, while retaining rings 5 and washers 6 help keep the bearings and the rollers in their desired position in the tool apparatus assemblage. Rigid support blocks 10, butting against end flanges 8 and 8' and center flange 9 provide the rigidity and strength of structure necessary so that the ends of roller bearings 6 near the center flange 9 can exert the pipe diameter expanding force necessary to change its cross-sectional shape from circular to elliptical as the tool progresses down through the vent pipe.

Element 14 of FIG. 1 (shown partially only) is the drive shaft (coupled to top flange 8) which element is suitable for being coupled to an external power source, such as a drill motor; element 11 is a "bumper" employed at the bottom of the tool device so as to enable sensing when the bottom of the T-fitting trap is reached by the tool so as to prevent damage to the trap by "screwing" the tool device too far down the vent pipe; element 12 is a rod (broken view) for connecting the bumper to the bottom flange 8' and item 13 denotes a threaded connection for the bumper rod into bottom flange 8'.

FIG. 2 illustrates the deliberate offset angular insertion of the axles 3 of the rollers 2 in the end flange members 8 and 8' of approximately 6 degrees which accomplishes the making of the desired twisted frame.

FIG. 3 illustrates the effect of the intentional misalignment of the opposite sets of rollers, which misalignment causes the rollers to be non-parallel with the vertical inside of the pvc pipe and as such causes the rollers to advance or retreat depending on the direction of rotation of the drive shaft and of the rollers on the internal pipe surface which the rollers are contacting.

In FIG. 4, the vent pipe 17 is seated as desired in T-shaped trap fitting 15 connected to sewer pipe 16, the sewage in the pipe designated by 18. Sealing rings 22 are typically employed for anti-leak liquid tightnes of pipe 17 in T-fitting 15; and also between the T-fitting and the sewer pipe, as illustrated.

In FIG. 5, pipe 17 has been pulled upwardly out of the T-fitting 15 and has also been slightly laterally displaced by natural physical forces, such as frosting and thawing repetitions over the course of time, and ground water 19 is shown seeping into the sewer 16 and blending with the sewage 18.

Figure 6:
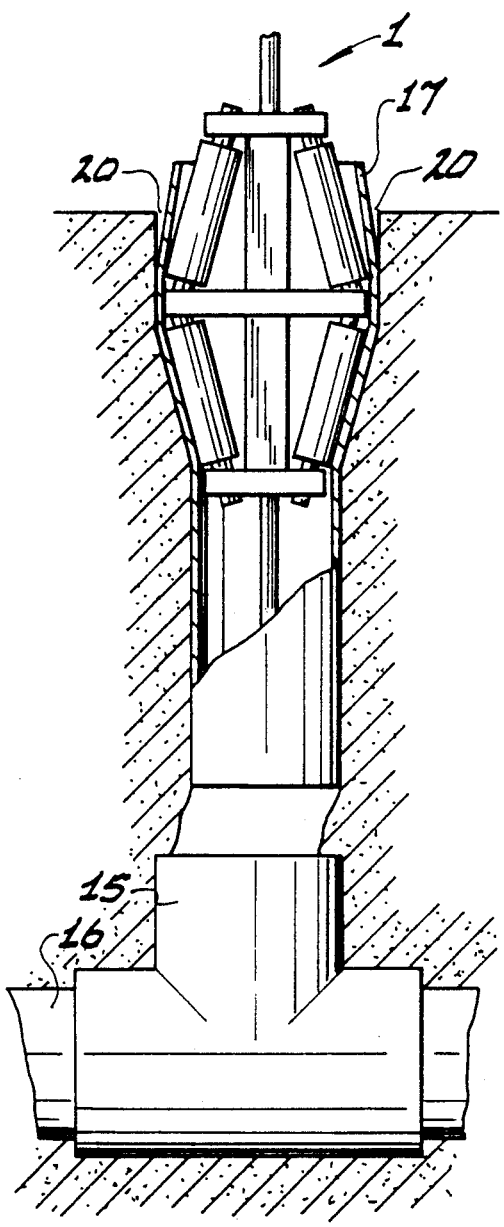
FIG. 6 is a vertical section view showing the use of the device of this invention to enlarge the earth duct tunnel surrounding the pvc pipe vent of FIG. 5.
Figure 7:
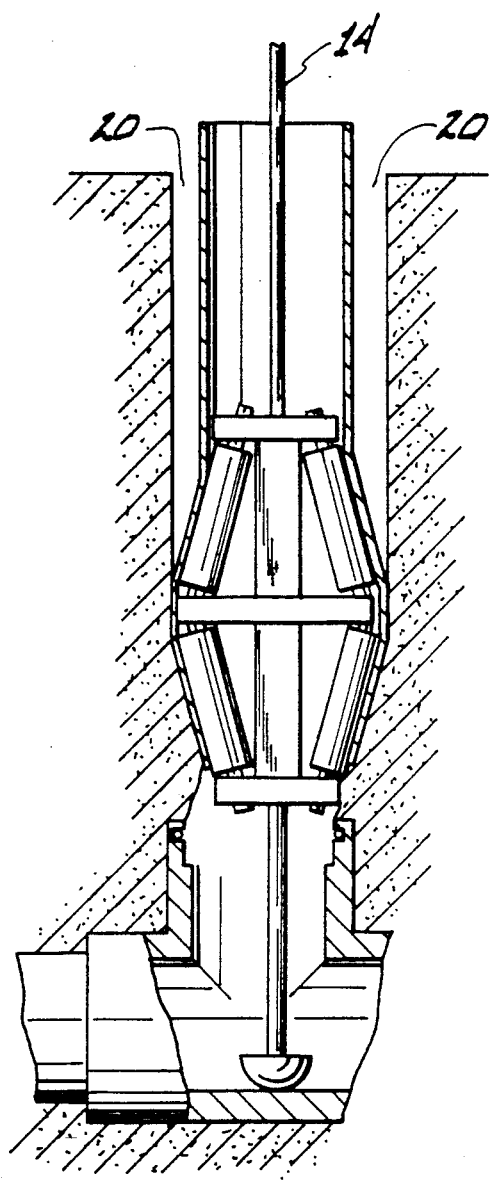
FIG. 7 is a vertical section view showing the widening of the earth duct surrounding the vent pipe for most of its length; also showing the bottoming of an attachment to the apparatus in the T-fitting trap, which attachment is employed to let the operator of the tool know when the attachment has contacted the bottom of the trap and stop "drilling" and thereby insure against damaging of the T-fitting trap by the downward movement and rotation of the tool apparatus.

In order to cure the undesired condition illustrated in FIG. 5, the special tool apparatus and method of the present invention was devised. The tool's use is illustrated in FIGS. 6 and 7. As previously stated, this method involves the finding that the cross-sectional dimension of the pvc vent pipe 17 may be substantially increased while still in the ground and without rupturing or damaging it; and that the force it temporarily exerts enlarges the earth surrounding said vent pipe (caused by the use of the tool of this invention) and is sufficient to increase the diameter of the earth duct 20 surrounding the pipe a sufficient amount so that the vent pipe can then be re-inserted into its original T-shaped pipe fitting trap. Or, if the diameter of the earth duct has not been increased sufficiently to accomplish the desired re-insertion of the vent pipe, it will at least have been enlarged sufficiently that wedging can be inserted between the earth duct and the pipe so that one or more additional "pass-throughs" of the tool into the pipe will provide for the clearance necessary to overcome the problem of lateral displacement of the pipe and thus permit its easy re-insertion into the pipe fitting trap.

FIGS. 8, 9, 10 and 11 are set forth to assist in explaining the procedures or devices employed in the re-insertion process.

Figures 8, 9:
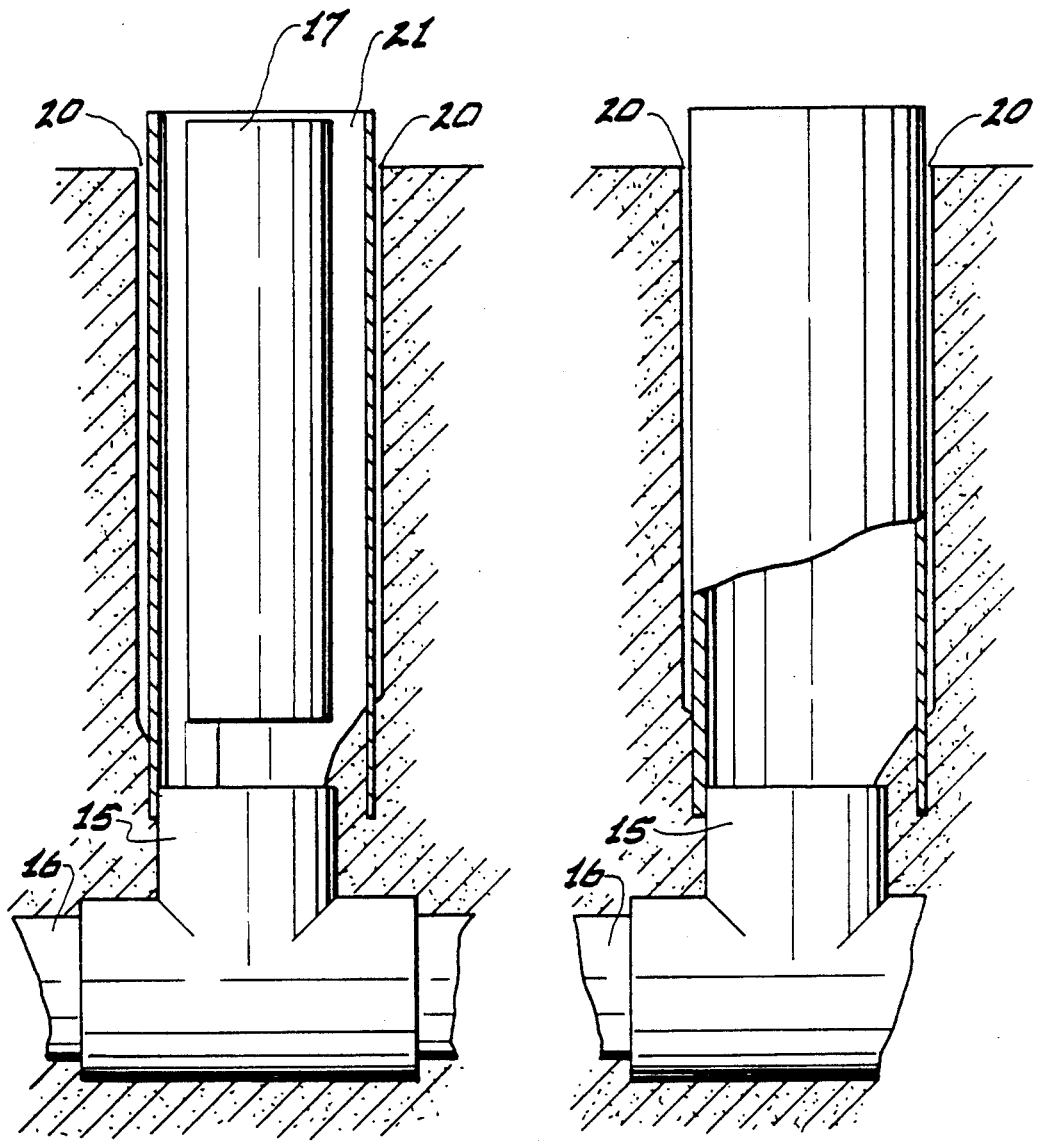
FIG. 8 is a vertical section view showing the insertion of a shield pipe in place in the earth duct tunnel, surrounding the vent pipe before it is removed; so as to stop seepage of water into the T-fitting trap until a replacement vent pipe is installed into same and so as also to minimize or prevent collapse of the wall of the earth duct tunnel into the duct and/or into the T-fitting trap.
FIG. 9 is a view similar to that of FIG. 8 except that now the vent pipe has been removed from the enlarged earth duct tunnel.

The 4 inch diameter pvc sanitary vent pipes referred to in this specification typically range in length from about 6 feet to about 10 feet to where they are connected below to the T-fitting traps of the sewer. When the vent pipes are separated from the T-fittings, they typically may be uprooted only a few inches but sometimes as much as 16 inches from the T-fitting trap and laterally displaced from same less than an inch. The tool used to enlarge the cross-sectional dimension of the pipe typically enlarges it from its 4 inch diameter to a dimension of about 5 inches, thus correspondingly enlarging the diameter of the earth duct to 5 inches. Thus the enlargement of the earth duct by about an inch generally enables sufficient freedom of movement within the duct 20 to overcome the lateral displacement problem with only a single pass through of the tool and also sufficient that a temporary shield pipe 21 may be inserted down the duct to surround the pipe as illustrated in FIG. 8. This procedure provides a temporary measure for minimizing the amount of water or ground particles that can get into the sewer system until the vent pipe 17 (or its replacement) can be re-inserted and connected to its T-shaped trap fitting 15. A tight re-connection of the vent pipe into the fitting is typically accomplished, once the earth pressure problem has been overcome, by manual insertion of the vent pipe to the base of the bell-shaped female T-fitting, which accepts the pipe with its surrounding doughnut-shaped gasket, which is sized to fit the inside diameter of the trap's female opening. In some cases, it may be desirable or necessary to insert a second tubular shield around the existing vent pipe and within the confines of the first ground shield to press the gasket into its final seat in its female T-fitting trap. An additional threaded press-type device can also be used to assist in re-seating the vent riser into its gasketed trap T-fitting.

Figures 10, 11:
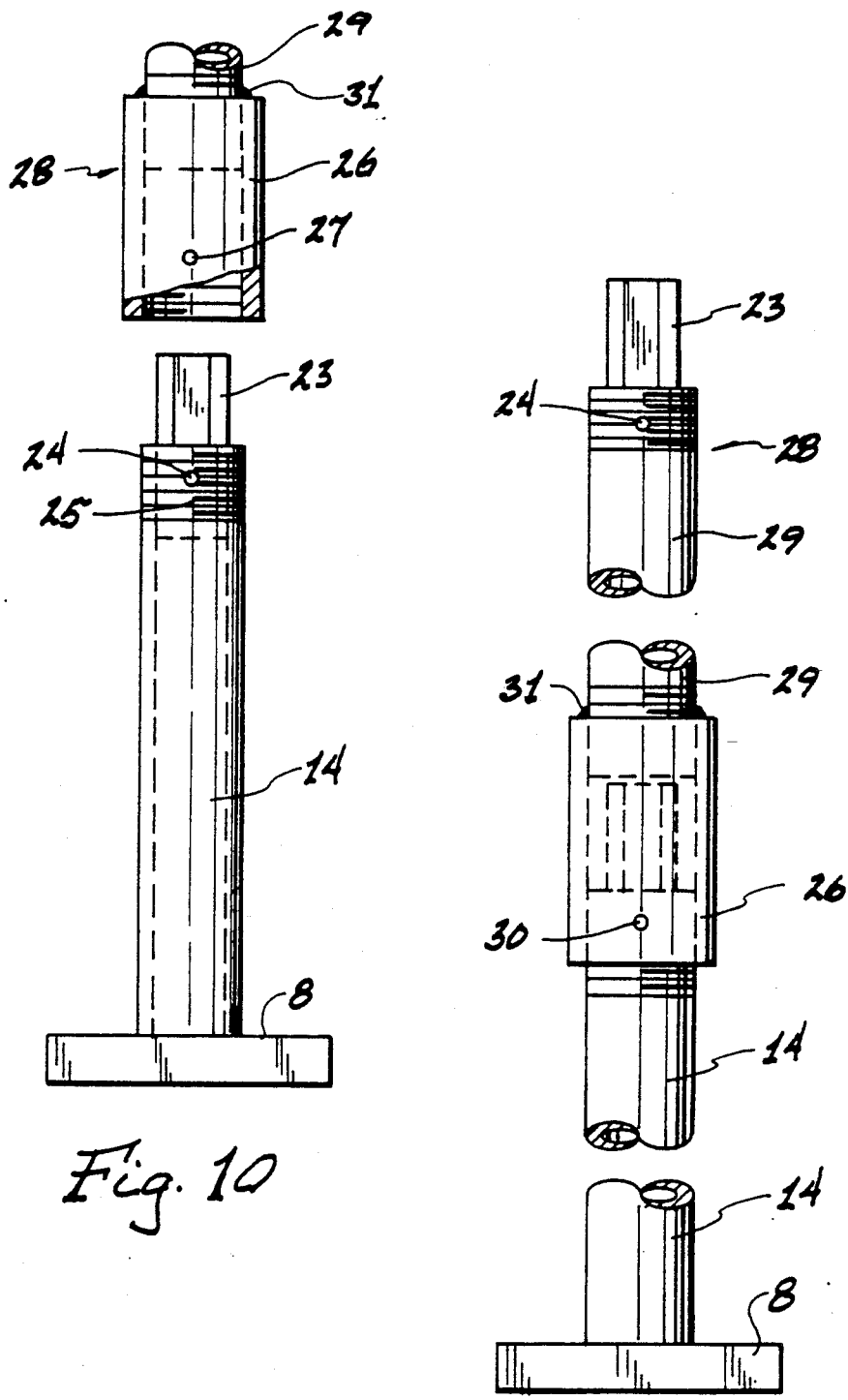
FIG. 10 is an "exploded" vertical view of the drive shaft and an extension for same.
FIG. 11 is a view corresponding to FIG. 10 except that the drive shaft and the extension for same have been coupled together.

FIG. 10 illustrates a drive shaft and drive shaft extension (uncoupled) for the tool (broken view); and FIG.

11 illustrates a drive shaft and drive shaft extension (coupled together, but broken view). Whether an extension is necessary depends on the length of the pipe duct to be enlarged. In any event, the drive shaft must be of adequate strength to rotate the tool and also adaptable to being connected to an external motor or drive of any type with sufficient power to rotate the drive shaft and the tool within the buried pipe.

In these figures, drive shaft 14 is rigidly connected to the top flange 8 of the tool, such as by being welded thereon. The shaft 14 may be solid, or hollow with a hexagonal shaped member 23 within same. The end of the shaft may have external threads 25 for connecting to coupling member 26 which possesses internal threads 25a. Coupling member 26 is screwed onto the top of shaft 14 until hole 24 in shaft 14 lines up with hole 27 in the coupling member, after which they are pinned strongly together with pin 30 (FIG. 11). Drive shaft extension 29 will then be inserted into coupling 26 and welded therein at 31 as shown in FIG. 11 or it may first be welded to the coupling 26 (as shown in FIG. 10) before being added and pinned to drive shaft 14.

Reverting now to additional discussion of the features of the tool illustrated in FIG. 1, it should be appreciated that the roller support frame i.e. members 8, 8', 9 and 10 must be constructed of material adequate to support axles 3 for the rollers 2 and the drive shaft connection to the frame while the tool is being driven and in rotation within the pipe in its elliptical state while buried.

The rollers are tubular in shape, each typically being about $4\frac{1}{4}$ inches long with an outside diameter of about $1\frac{1}{4}$ inches. Each of the rollers possesses an exle bore through the center of the tube roller, perpendicular to the circumference of the roller, said bore's diameter being slightly greater than that of the axles 3 within same. In addition to the axle bore, each end of each roller possesses a bearing bore to house bearings 4 at said sites. In addition, a retainer ring groove is cut into the internal ends of the rollers for retaining rings to maintain bearing location. Finally, washers 6 are located where indicated in FIG. 1 to further assist in maintaining the bearings at their desired positions. The eight bearings (two required for each roller) must be of adequate size and strength to not only endure the inward pressure of the combined ground and pipe resistance, but also, as has been mentioned, to be able to assist in exerting the necessary outward pressure by the rollers so as to force the change in shape of the pipe from round to elliptical, while progressively advancing downward in the pipe. Needle type bearings are preferred for use in the tool apparatus. Bearings used have a dynamic load rating of approximately 3900 pounds per bearing and a static load rating of approximately 5000 pounds.

The roller axles 3, preferably made of hardened steel, are of circumference which are adaptable to the circumference of the bore of the bearings and of length adequate to bridge into the support frame members 8, 8' and 9, as illustrated in FIG. 1, through axle mounting holes in said frame members, after which they are pinned in end frame members 8 and 8' by pins 7. The pins are inserted both through holes in the frame members 8 and 8' and through holes in the axles as well to prevent movement of the axles in any direction.

The retainer rings 5 are sized to the size of retainer ring grooves in the rollers and are installed after the bearings 4, to retain the bearings positions within the rollers.

End flange 8' possesses a threaded bore 13 to allow adaptation of a "tool stop", i.e. bumper rod 12 and bumper 11, if required.

With further reference now to FIGS. 2 and 3, FIG. 2 illustrates the deliberate offset angular insertion of axles 3 in the end flange members 8 and 8' of approximately 6 degrees which accomplishes the desired twisted frame (shown in the top view of FIG. 3) which creates a screw effect clockwise or counterclockwise twist as the tool is driven or extracted by the external power source and rotated within the semi-rigid pipe. As shown in FIG. 2, axles 3 are inserted into angled slots in top flange 8 and into angled slots in bottom flange 8', and continue at the same angle into slots in the center horizontal flange member 9. Center member 9 has slots on both its top and bottom to receive the axles.

Typically the length of the tool between the top of end flange 8 to the bottom of end flange 8' is about 12 inches, the width of flange 9 is about 4 inches and the eccentric twist dimension caused by the tool in the vent pipe comes to allow enlarged pipe duct of about 5 inches. Most of the materials used in its construction will be made from steel.

As previously pointed out, use of the tool enables re-insertion of a pvc riser vent pipe into its T-fitting trap below the ground surface, avoiding digging and overcoming the problem of unwanted ground water infiltration into the sanitary sewer system. This is very important environmentally since typically, in times of rapid thaws or heavy rains, the flow rates of influent sanitary waste into the municipal water treatment facilities average 3 to 5 times the normal flow rates into the system. This excess water infiltration into the network of sewer drains is primarily from the uprooted sanitary vent risers, which allows any surrounding ground water to drain into the T-fitting traps. Because of the plant's viological bacteria mobility, excess water flows of this dimension would flush the bacteria out of the facility and render the treatment plant non-functional. Therefore the only measure that can be taken to protect the plant's necessary bacteria count is to bypass the plant entirely until the excess water flows are renduced to normal rates. During this bypass the raw sewage is bypassed from the plant and virtually leaves the plant untreated.

In further reference to this infiltration problem, which is necessitating the bypass, unsanitary conditions are created as referred to above which violate local, state and federal health and environmental codes and standards.

While the present invention has been described and illustrated in detail various modifications may be made by those skilled in the art. It is therefore to be understood that the invention is not to be limited to the details of construction described and illustrated and it is intended by the appended claims to cover all modifications which fall within the spirit and scope of the invention.

I claim:

1. A tool apparatus suitable for being inserted into and rotated within a semi-rigid pipe and to cause the walls of the pipe, when progressively rotated within and screwed into same to assume an elliptical cross-section shape of larger dimension than its previous circular diameter, said tool apparatus comprising the following elements:

a. a drive shaft suitable for being coupled to an external power source;

b. three substantially parallel roller frame mounting elements, one of which is connected to the drive shaft and each of which have openings extending into said mounting elements near the outer perimeters thereof;

c. four axles surrounded by rollers installed between said mounting elements in the openings in same in a manner that two of said axles and surrounding rollers are on one side of the middle mounting element and two are on the other side of said middle mounting element, and the axes of the opposite sets of said axles and rollers not being vertically aligned with each other, but rather being off-set from each other by an angle of approximately 6 degrees so as to create a twisted frame which creates a screw effect as the tool is driven by the external power source and rotated within the semi-rigid pipe;

d. bearings between the axles and rollers, surrounding the axles at each of their ends; and e. two rigid support blocks, each located centrally in the tool apparatus and connected to the mounting elements, one on one side of the middle mounting element and the other on the other side of the middle mounting element.

2. An apparatus according to claim 1 when possessing a shaft and a bumper element connected to the bottom of the roller frame mounting element most distant from the roller frame mounting element which is connected to the drive shaft.

3. A method of overcoming undersired seepage of ground water into a sanitary sewer system employing semi-rigid pvc vertical vent pipes wherein the vent pipes have been displaced from their T-fitting traps in the sewer system which comprises:

A. inserting and rotating within the semi-rigid pipe a tool apparatus to cause the walls of the pipe when progressively rotated within and screwed into same to assume an elliptical shape of larger dimension than its previous circular diameter, said tool apparatus comprising the following elements:

a. a drive shaft suitable for being coupled to an external power source;

b. three substantially parallel roller frame mounting elements, one of which is connected to the drive shaft and each of which have openings extending into said mounting elements near the outer perimeters thereof;

c. four axles surrounded by rollers installed between said mounting elements in the openings in same in a manner that two of said axles and surrounding rollers are on one side of the middle mounting element and two are on the other side of said middle mounting element, and the axes of the opposite sets of said axles and rollers not being vertically aligned with each other, but rather being off-set from each other by an angle of approximately 6 degrees so as to create a twisted frame which creates a screw effect as the tool is driven by the external power source and rotated within the semi-rigid pipe;

d. bearings between the axles and rollers, surrounding the axles at each of their ends; and e. two rigid support blocks, each located centrally in the tool apparatus and connected to the mounting elements, one on one side of the middle mounting element and the other on the other side of the middle mounting element;

B. continuing downward rotation of the tool apparatus until necessary reduction of ground pressure against the pipe is achieved to allow manipulation of the pipe in which it is working and to allow clearance for insertion of a tubular ground shield in the earth duct surrounding said pipe; and C. re-inserting the vent pipe with surrounding gasket into its female T-fitting trap.

4. A method of overcoming undersired seepage of ground water into a sanitary sewer system employing semi-rigid pvc vertical vent pipes wherein the vent pipes have been displaced from their T-fitting traps in the sewer system which comprises:

A. inserting and rotating within the semi-rigid pipe a tool apparatus to cause the walls of the pipe when progressively rotated within and screwed into same to assume an elliptical shape of larger dimension than its previous circular diameter;

B. continuing downward rotation of the tool apparatus until necessary reduction of ground pressure against the pipe is achieved to allow manipulation of the pipe in which it is working and to allow clearance for insertion of a tubular ground shield in the earth duct surrounding said pipe; and C. re-inserting the vent pipe with surrounding gasket into its female T-fitting trap.

5. A method according to claim 3 wherein a second tubular shield is inserted around the existing vent pipe and within the confines of the ground shield to press the gasket into its final seat in its female T-fitting trap.

6. A method according to claim 4 wherein a second tubular shield is inserted around the existing vent pipe and within the confines of the ground shield to press the gasket into its final seat in its female T-fitting trap.

* * * * *